United States Patent
Xie et al.

(10) Patent No.: US 11,929,515 B2
(45) Date of Patent: *Mar. 12, 2024

(54) BATTERY PACK CASE AND BATTERY PACK

(71) Applicant: CONTEMPORARY AMPEREX TECHNOLOGY CO., LIMITED, Ningde (CN)

(72) Inventors: Zhaolin Xie, Ningde (CN); Peng Wang, Ningde (CN); Derong Wang, Ningde (CN); Libing Chan, Ningde (CN); Zengzhong Wang, Ningde (CN); Yifeng Chen, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/990,849

(22) Filed: Nov. 21, 2022

(65) Prior Publication Data

US 2023/0077414 A1 Mar. 16, 2023

Related U.S. Application Data

(63) Continuation of application No. 16/977,508, filed as application No. PCT/CN2018/124616 on Dec. 28, 2018, now Pat. No. 11,539,092.

(30) Foreign Application Priority Data

Mar. 30, 2018 (CN) .......................... 201820447239.7

(51) Int. Cl.
*H01M 50/20* (2021.01)
*H01M 50/10* (2021.01)
*H01M 50/202* (2021.01)

(52) U.S. Cl.
CPC ........... *H01M 50/20* (2021.01); *H01M 50/10* (2021.01); *H01M 50/202* (2021.01); *H01M 2220/20* (2013.01)

(58) Field of Classification Search
CPC .... H01M 50/20; H01M 50/10; H01M 50/202; H01M 2220/20; H01M 50/291; H01M 50/207; Y02E 60/10

(Continued)

(56) References Cited

U.S. PATENT DOCUMENTS 5,667,907 A 9/1997 Audit et al.
5,667,909 A 9/1997 Rodriguez et al.
(Continued)

FOREIGN PATENT DOCUMENTS

CN 101573809 B 2/2013
CN 104144580 A 11/2014
(Continued)

*Primary Examiner* — M Baye Diao
(74) *Attorney, Agent, or Firm* — Ladas & Parry LLP

(57) ABSTRACT

The application relates to a battery pack case and a battery pack. The battery pack case includes: a bottom plate and a side plate connected with the bottom plate, the bottom plate and the side plate surround to form an accommodating portion configured to accommodate a unit cell; the bottom plate is provided with a plurality of first grooves and a plurality of second grooves opening toward the accommodating portion, the plurality of first grooves are spaced apart from each other, the plurality of second grooves are spaced apart from each other, and the first grooves and the second grooves are arranged to cross each other. The bottom plate of the battery pack itself has good rigidity, is not prone to warp deformation, and can prevent the overflow of structural glue from contaminating the wiring harness or electrical components.

9 Claims, 7 Drawing Sheets

(58) Field of Classification Search
USPC .......................................................... 320/112
See application file for complete search history.

(56) References Cited

U.S. PATENT DOCUMENTS

| | | | |
|---|---|---|---|
| 11,108,113 B2 * | 8/2021 | Marutani | .............. H01M 10/48 |
| 2005/0282069 A1 * | 12/2005 | Kim | ................... H01M 50/191 |
| | | | 429/185 |
| 2011/0143179 A1 | 6/2011 | Nakamori | |

FOREIGN PATENT DOCUMENTS

| | | | | |
|---|---|---|---|---|
| CN | 206349247 U | | 7/2017 | |
| CN | 206349427 U | | 7/2017 | |
| CN | 107017371 A | | 8/2017 | |
| CN | 206878064 U | | 1/2018 | |
| CN | 206878604 U | | 1/2018 | |
| CN | 207116640 U | | 3/2018 | |
| CN | 207967118 U | | 10/2018 | |
| CN | 207993915 U | | 10/2018 | |
| CN | 109671888 A | | 4/2019 | |
| CN | 107492606 B | * | 3/2021 | ............ H01M 50/20 |
| DE | 112007002525 T5 | | 9/2009 | |
| JP | 2013089449 A | | 5/2013 | |
| KR | 20140140795 A | * | 12/2014 | .......... H01M 50/579 |

* cited by examiner

BATTERY PACK CASE AND BATTERY PACK

CROSS-REFERENCE OF RELATED APPLICATIONS

This application is a continuation of U.S. patent application Ser. No. 16/977,508, filed on Dec. 28, 2018, which is a national phase application of International Application No. PCT/CN2018/124616, filed on Dec. 28, 2018. The International Application claims priority to Chinese Patent Application No. 201820447239.7, filed on Mar. 30, 2018. The aforementioned patent applications are hereby incorporated by reference in their entireties.

TECHNICAL FIELD

The present application relates to the technical field of batteries, in particular to a battery pack case and a battery pack.

BACKGROUND

With the development of technology, the application range of power batteries is getting wider and wider, involving production or life. Power batteries are also called as secondary batteries and are rechargeable batteries. Power batteries are widely used. Low-capacity power batteries can be used in small electric vehicles, and high-capacity power batteries can be used in large electric vehicles, for example, hybrid vehicles or electric vehicles. When power batteries are used in groups, bus bar is needed to be used to connect each power battery in series or in parallel. Power batteries are grouped to form battery modules. Multiple battery modules are encapsulated by the pack case.

In the prior art, the bottom of the sheet metal pack case is flat, and its strength is poor. After the pack case is welded and the reinforcing beam is welded, the flatness is greatly affected, and it is difficult to ensure the flatness of the bottom of the pack case. At present, the flatness and strength of the lower pack case of the sheet metal battery pack are poor. When assembling the battery module, it is easy to cause unevenness of the power battery, which is not favorable to the welding of the bus bar between the power batteries in the subsequent process, and virtual welding is easy to occur. When installing the battery module, glue needs to be coated on the bottom of the pack case to bond and fix the battery module. Due to the poor flatness of the bottom of the pack case, it is easy to cause uneven thickness of the glue layer. At the same time, the excess glue will also be squeezed by the bottom of the battery module and overflow to the surroundings. The excess glue will stick to the wiring harness or electrical components, which will cause difficulties for the subsequent installation process and maintenance.

SUMMARY

Embodiments of the present application provide a battery pack case and a battery pack. The bottom plate of the battery pack case itself includes good rigidity, is not prone to warp deformation, and can prevent the overflowing structural glue from contaminating the wiring harness or electrical components.

In an aspect, an embodiment of the present application proposes a battery pack case, which comprises: a bottom plate and a side plate connected to the bottom plate, the bottom plate and the side plate surround to form an accommodating portion configured to accommodate a unit cell; a plurality of first grooves and a plurality of second grooves opening toward the accommodating portion are provided on the bottom plate, the plurality of first grooves are spaced apart from each other, the plurality of second grooves are spaced apart from each other, and the first groove and the second groove are arranged to cross each other.

According to an aspect of an embodiment of the present application, the first grooves extend in a length direction of the bottom plate, and the plurality of first grooves are arranged in parallel, the second grooves extend in a width direction of the bottom plate, and the plurality of second grooves are arranged in parallel.

According to an aspect of an embodiment of the present application, the first grooves and the second grooves are perpendicular to each other.

According to an aspect of the embodiment of the present application, a surface of the bottom plate facing away from the accommodating portion is further provided with first convex portions corresponding to the first grooves and second convex portions corresponding to the second grooves.

According to an aspect of an embodiment of the present application, the battery pack case further comprises a plurality of reinforcing beams, and the plurality of reinforcing beams are spaced apart along the length direction or width direction of the bottom plate.

According to an aspect of an embodiment of the present application, the battery pack case further comprises a strip plate, the strip plate is disposed at a connection between a long side of the bottom plate along the length direction of the bottom plate and the side plate, and the strip plate comprises a first long side along the length direction of the bottom plate and a second long side along the length direction of the bottom plate opposite to each other, the first long side is connected and fixed to the side plate, and the second long side is connected and fixed to the long side of the bottom plate.

According to an aspect of the embodiment of the present application, a surface of the second long side facing away from the bottom plate is lower than a surface of the bottom plate facing the accommodating portion, the strip plate further comprises a plurality of first glue receiving grooves provided on the second long side, the plurality of first glue receiving grooves are arranged at intervals along the length direction of the bottom plate.

According to an aspect of an embodiment of the present application, the battery pack case further comprises a supporting beam, the supporting beam is disposed on a surface of the bottom plate facing the accommodating portion, the supporting beam comprises a first connecting section, an intermediate supporting section and a second connecting section that are successively distributed, the first connecting section is connected and fixed to the side plate or a wide side of the bottom plate along the width direction of the bottom plate, the second connecting section is connected and fixed to the wide side of the bottom plate, and the intermediate supporting section is configured to install the unit cell.

According to an aspect of an embodiment of the present application, the intermediate supporting section protrudes away from the bottom plate, and comprises a top surface parallel to the surface of the bottom plate facing the accommodating portion, and a fixing hole provided on the top surface and configured to fix the unit cell.

According to an aspect of an embodiment of the present application, a surface of the second connecting section facing away from the bottom plate is lower than a surface of the bottom plate facing the accommodating portion, the supporting beam further comprises a plurality of second glue receiving grooves provided on the second connecting section, and the second glue receiving grooves are arranged at intervals along the width direction of the bottom plate.

According to the battery pack case provided by the embodiment of the present application, the first grooves and the second grooves are provided on the bottom plate. On the one hand, it can improve the strength and rigidity of the bottom plate, thereby avoiding warp deformation of the bottom plate, ensuring that the bottom plate maintains good flatness, and further ensuring that the tops of the multiple unit cells installed and fixed on the bottom plate are flush, which is favorable to welding operation of the bus bar on two adjacent unit cells. On the other hand, the first grooves and the second grooves can be used to collect the excess structural glue squeezed out by the unit cell, so as to avoid the structural glue from overflowing and contaminating the wiring harness or other electrical components, or causing the wiring harness or other electrical components to stick to each other, which is convenient for subsequent maintenance or replacement of wiring harness or electrical components.

In another aspect, an embodiment of the present application provides a battery pack, which comprises: a battery pack case comprising a bottom plate and a side plate connected to the bottom plate, the bottom plate and the side plate surround to form an accommodating portion configured to accommodate a unit cell, a plurality of first grooves and a plurality of second grooves opening toward the accommodating portion are provided on the bottom plate, the plurality of first grooves are spaced apart from each other, the plurality of second grooves are spaced apart from each other, and the first grooves and the second grooves are arranged to cross each other; a plurality of battery assemblies, which are provided in the accommodating portion and supported by the bottom plate, and the plurality of battery assemblies are arranged side by side along the width direction of the bottom plate, each of the battery assemblies comprises a plurality of unit cells arranged side by side along the length direction of the bottom plate.

BRIEF DESCRIPTION OF THE DRAWINGS

The features, advantages, and technical effects of exemplary embodiments of the present application will be described below with reference to the drawings.

Figure 1:
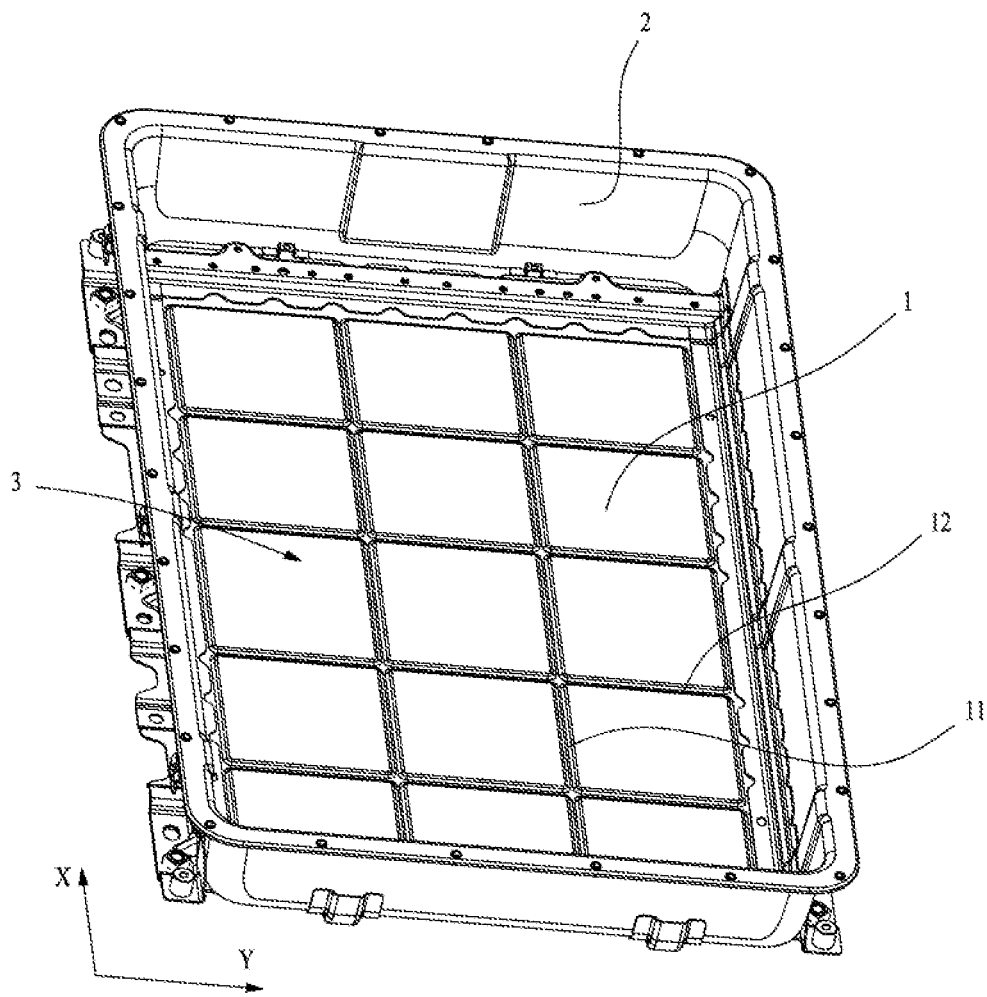
FIG. 1 is a schematic diagram of the overall structure of a battery pack case according to an embodiment of the present application.

In the drawings, the drawings are not drawn to actual scale.

REFERENCE DESCRIPTION 1. bottom plate; 11. first groove; 12. second groove; 13. first convex portion; 14. second convex portion;
2. side plate;
3. accommodating portion;
4. reinforcing beam;
5. strip plate; 51. first long side; 52. second long side; 53. first glue receiving groove;
6. supporting beam; 61. first connecting section; 62. intermediate supporting section; 62a. fixing hole; 63. second connecting section; 64. second glue receiving groove;

X length direction; Y width direction.

DETAILED DESCRIPTION

The implementation of the present application will be described in further detail below with reference to the drawings and embodiments. The detailed description and drawings of the following embodiments are used to exemplarily illustrate the principle of the present application, but cannot be used to limit the scope of the present application, that is, the present application is not limited to the described embodiments.

In the description of this application, it need to be noted that, unless otherwise stated, the meaning of "plurality" is two or more; the terms "upper", "lower", "left", "right", "inner", "outside" and other indicating orientations or positional relationships are only for the convenience of describing the present application and simplifying the description, rather than indicating or implying that the device or element referred to must have a specific orientation, be constructed and operated in a specific orientation, and therefore cannot be understood as a limitation to the present application. In addition, the terms "first", "second", etc. are used for descriptive purposes only, and cannot be understood as indicating or implying relative importance.

In the description of this application, it need also be noted that, unless otherwise clearly specified and limited, the terms "install", "be connected with", and "connect" should be understood in a broad sense, for example, it can be fixed connected or detachably connected, or integrally connected; it can be either directly connected or indirectly connected through an intermediary. For those of ordinary skill in the art, the specific meanings of the above terms in the present application may be understood according to specific circumstances.

In order to better understand the present application, the battery pack case of the embodiment of the present application will be described in detail below with reference to FIGS. 1 to 7.

Figure 2:
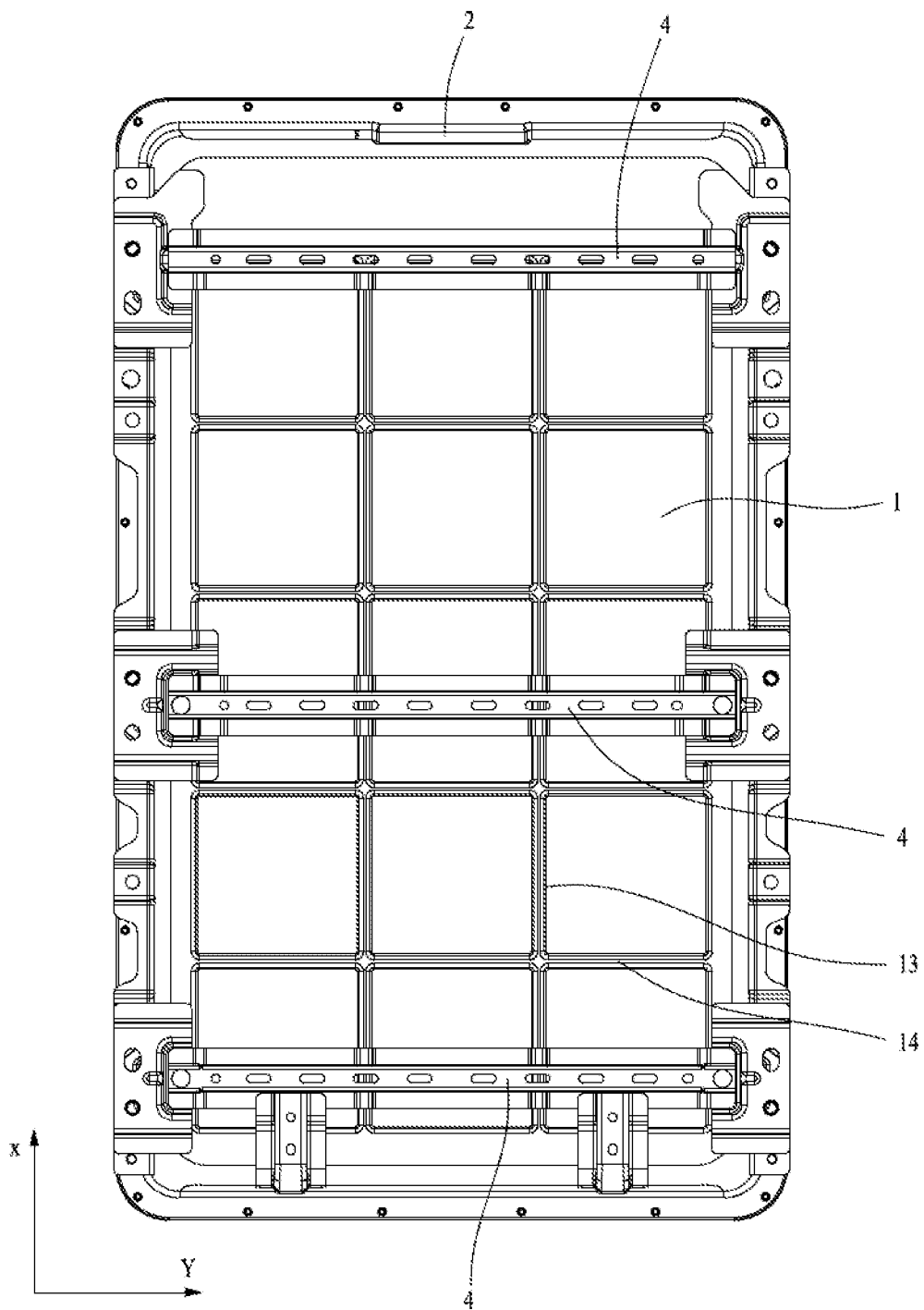
FIG. 2 is a schematic diagram of the back structure of a battery pack case according to an embodiment of the present application.
Figure 3:
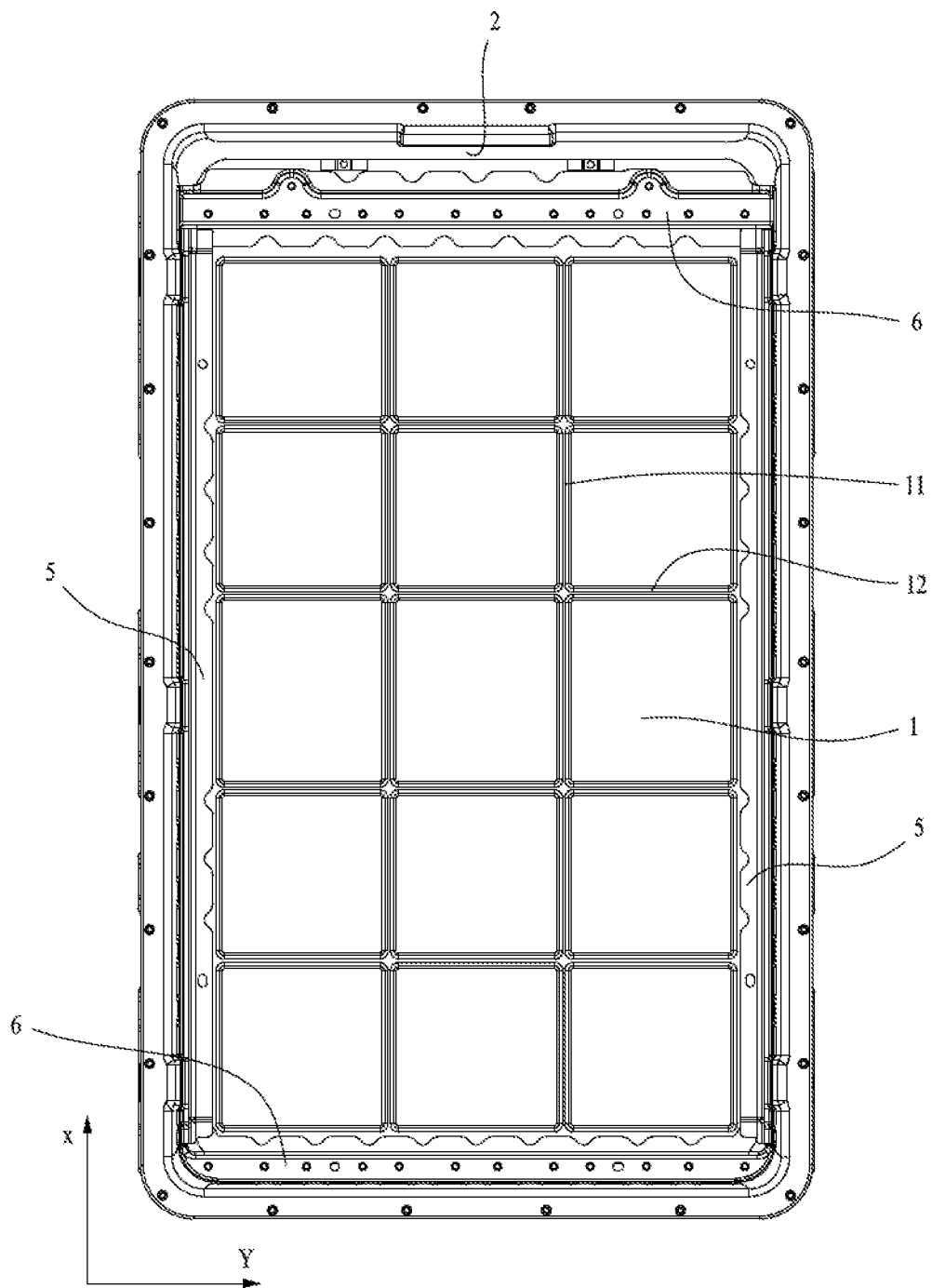
FIG. 3 is a schematic diagram of the front structure of a battery pack case according to an embodiment of the present application.
Figure 4:
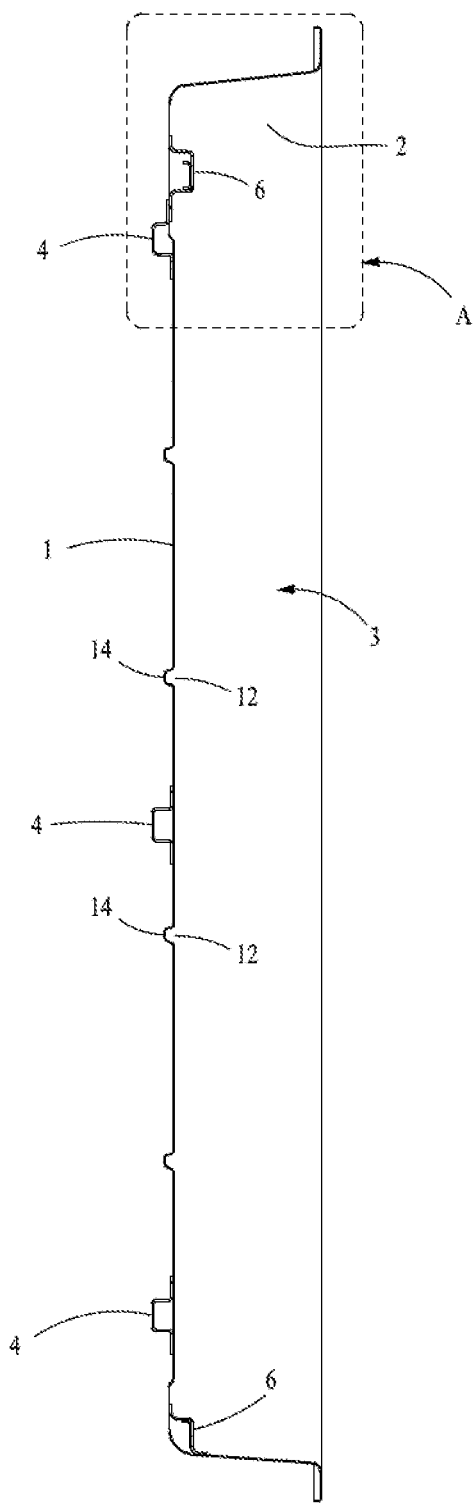
FIG. 4 is a schematic diagram of a sectional structure of a battery pack case according to an embodiment of the present application along the length direction.
Figure 5:
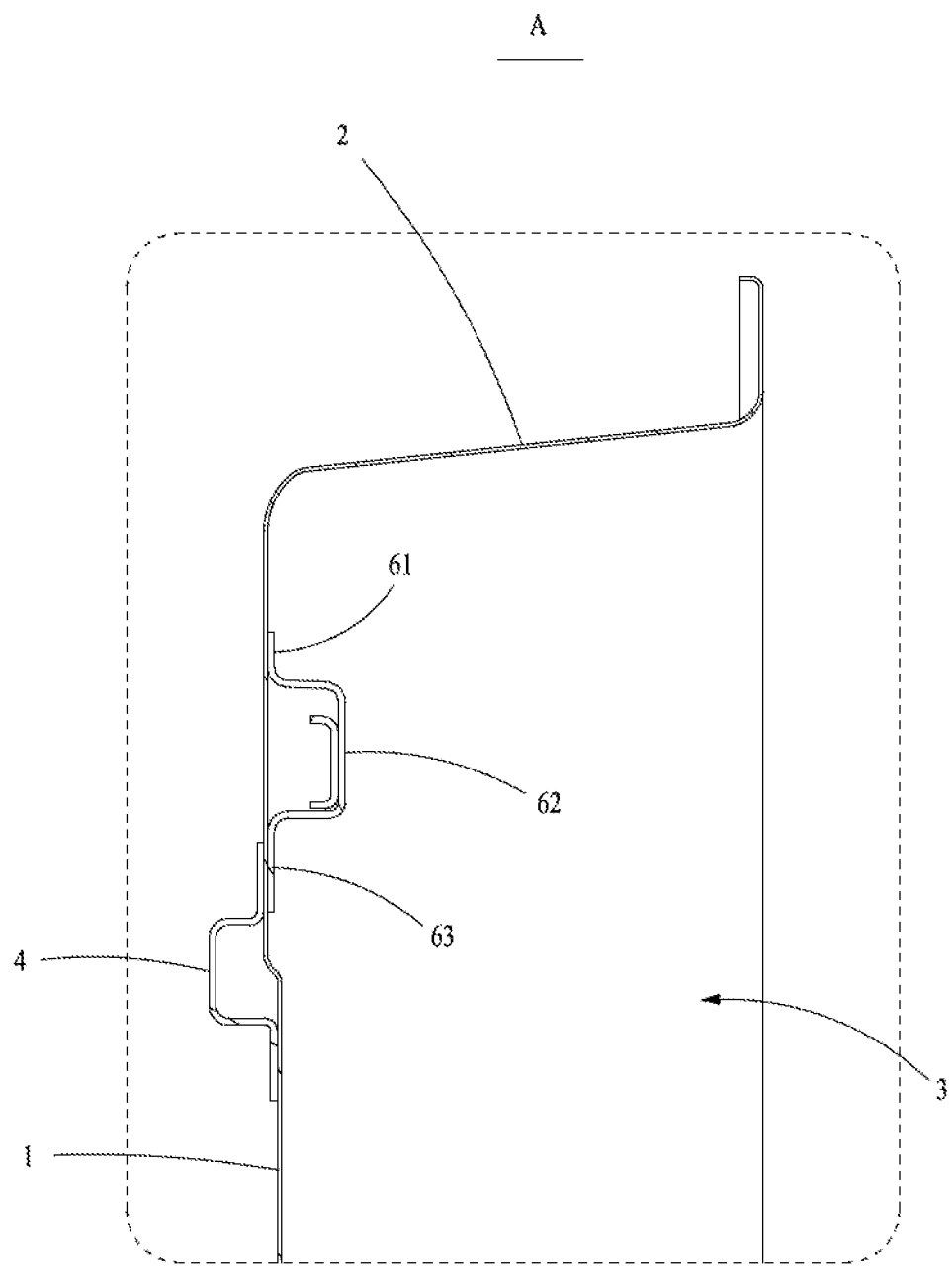
FIG. 5 is a partial enlarged view at A in FIG. 4.
Figure 6:
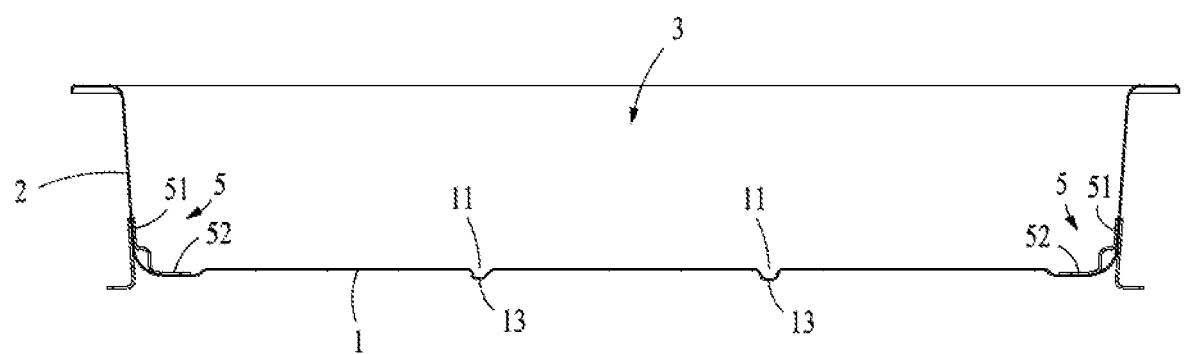
FIG. 6 is a schematic diagram of a sectional structure of a battery pack case according to an embodiment of the present application along the width direction.
Figure 7:
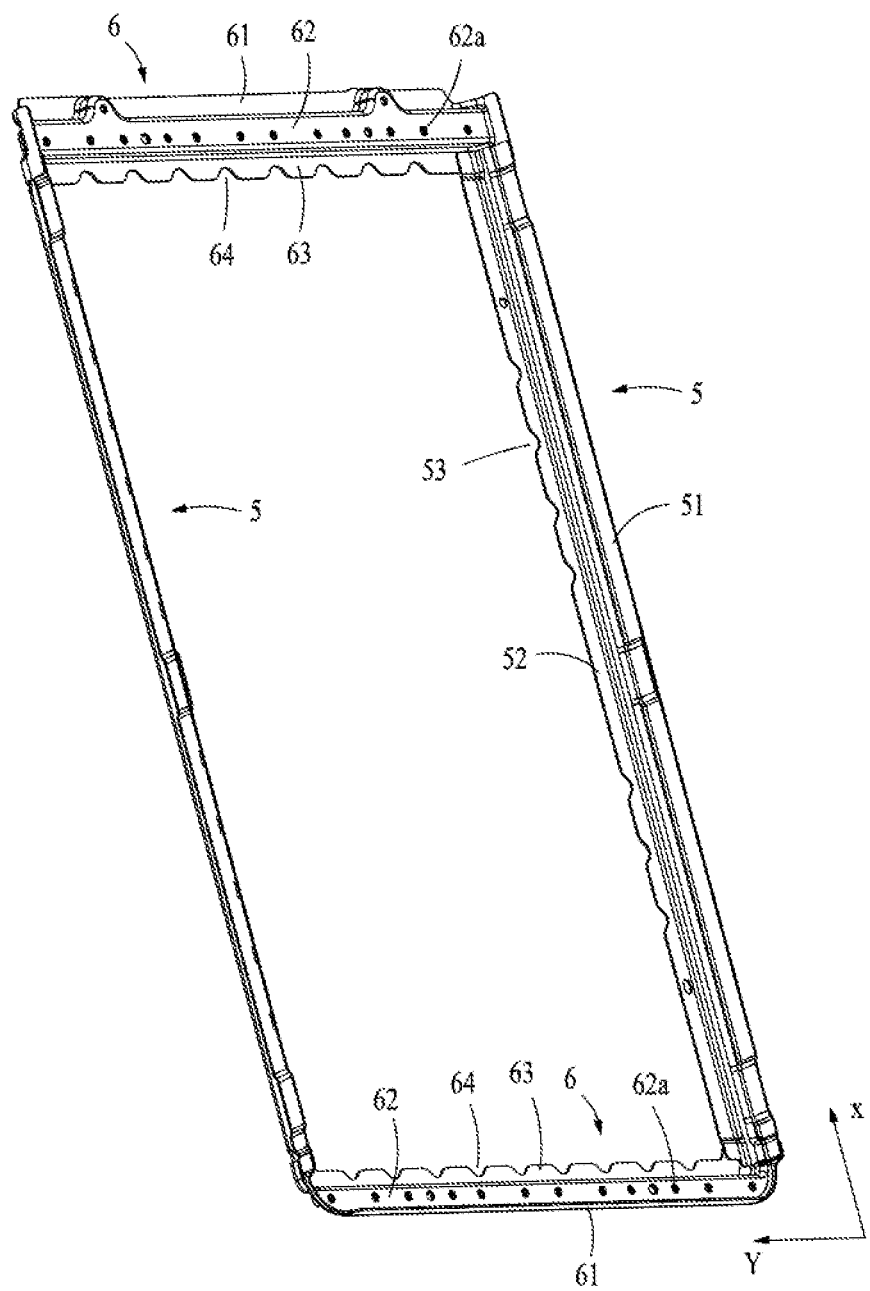
FIG. 7 is a schematic diagram of a connection structure of a strip plate and a supporting beam according to an embodiment of the present application.

FIG. 1 schematically shows the overall structure of the battery pack case of the present embodiment. FIG. 2 schematically shows the back structure of the battery pack case of the present embodiment. FIG. 3 schematically shows the front structure of the battery pack case of the present embodiment. FIG. 4 schematically shows the sectional structure of the battery pack case of the present embodiment along the length direction. FIG. 5 schematically shows a partially enlarged structure at A in FIG. 4. FIG. 6 schematically shows a sectional structure of the battery pack case of the present embodiment in the width direction. FIG. 7 schematically shows the connection structure of the strip plate and the supporting beam of the present embodiment.

The battery pack case of the present application is used to accommodate a unit cell (not shown in the figures) to form protection for the unit cell. At the same time, it can also accommodate the wiring harness or other electronic components related to the use of the unit cell and protect them. The unit cell of the present embodiment may be a square battery.

As shown by combining FIGS. 1 to 3, the battery pack case of the present embodiment includes a bottom plate 1 and a side plate 2 connected to the bottom plate 1. The bottom plate 1 and the side plate 2 surround to form an accommodating portion 3 for accommodating the unit cell. The unit cell is put into the battery pack case through the opening of the accommodating portion 3. The bottom plate 1 is provided with a plurality of first grooves 11 and a plurality of second grooves 12 opening toward the accommodating portion 3. The plurality of first grooves 11 are spaced apart from each other. The plurality of second grooves 12 are spaced apart from each other. The first grooves 11 and the second grooves 12 cross each other to form a grid-like structure.

On the one hand, an area for supporting the unit cell is divided between two adjacent first grooves 11 and two adjacent second grooves 12. The bottom of the unit cell is seated in this area. The first grooves 11 and the second grooves 12 crossing each other on the bottom plate 1 can improve the rigidity of the bottom plate 1 so that the bottom plate 1 is not prone to warp deformation due to its own internal stress, thereby ensuring the flatness of a surface of the bottom plate 1 facing the accommodating portion 3. In this way, when all the unit cells are installed in the battery pack case, the top height of all the unit cells are kept flush to avoid unevenness situation, which is favorable to stably welding the bus bar on the output electrodes of two adjacent unit cells in the subsequent process and ensures the welding stability of the bus bar and the output electrode during subsequent use.

On the other hand, an area for supporting the unit cell is divided between two adjacent first grooves 11 and two adjacent second grooves 12. Before the unit cell is installed, a predetermined amount of structural glue needs to be applied in this area. Since the bottom plate 1 includes good flatness, it can ensure that the thickness of the structural glue applied on the bottom plate 1 is uniform. In addition, during the installation of the unit cell, the structural glue is squeezed by the unit cell and flows around. The structural glue that is squeezed and overflowed by the unit cell can flow to the first grooves 11 and the second grooves 12 and be received and collected by the first grooves 11 and the second grooves 12 to avoid the overflow of excess structural glue and contaminating of the wiring harness or other electrical components, or causing the wiring harness or other electrical components to stick to each other, which is convenient for subsequent maintenance or replacement.

The bottom plate 1 of the present embodiment includes a predetermined length and width. The first grooves 11 extend in a length direction X of the bottom plate 1, and a plurality of first grooves 11 are arranged in parallel. The second grooves 12 extend in a width direction Y of the bottom plate 1, and a plurality of second grooves 12 are arranged in parallel. In this way, the first grooves 11 and the second grooves 12 divide the area of the bottom plate 1 in a more orderly manner, and further improve the rigidity of the bottom plate 1 itself. Alternatively, the plurality of first grooves 11 are arranged in parallel at equal intervals. The plurality of second grooves 12 are arranged in parallel at equal intervals. The plurality of first grooves 11 and the plurality of second grooves 12 divide a plurality of areas for supporting the unit cells. The area of each area is the same, so that the overall force of the bottom plate 1 is balanced, and the capability of resisting deformation is improved.

In one embodiment, the first grooves 11 and the second grooves 12 are perpendicular to each other. The area divided by the two adjacent first grooves 11 and the two adjacent second grooves 12 is rectangular. The first grooves 11 are perpendicular to a wide side of the bottom plate 1, which can prevent the wide side of the bottom plate 1 from warp deformation. The second grooves 12 are perpendicular to a long side of the bottom plate 1, which can prevent the long side of the bottom plate 1 from warp deformation. The first grooves 11 and the second grooves 12 which are perpendicular to each other are easy to process and manufacture.

As shown by combining FIG. 2 and FIG. 4, a surface of the bottom plate 1 of the present embodiment facing away from the accommodating portion 3 is further provided with first convex portions 13 corresponding to the first grooves 11 and second convex portions 14 corresponding to the second grooves 12. The first convex portions 13 and the second convex portions 14 can further increase the rigidity and the strength of the bottom plate 1 and withstand greater stress without deformation. In one example, the bottom plate 1 can be manufactured with the first grooves 11 and the second grooves 12 by stamping or mold pressing, or the first grooves 11, the first convex portions 13, the second grooves 12 and the second convex portions 14 are manufactured at the same time. Alternatively, the cross-sectional shapes of the first grooves 11 and the second grooves 12 are the same, and both are arc-shaped or U-shaped. The cross-sectional shape of the first convex portions 13 is the same as the cross-sectional shape of the first grooves 11, and the cross-sectional shape of the second convex portions 14 is the same as the cross-sectional shape of the second grooves 12.

The battery pack case of the present embodiment further includes a plurality of reinforcing beams 4. The plurality of reinforcing beams 4 are arranged at intervals along the length direction X or the width direction Y of the bottom plate 1. The reinforcing beams 4 are connected to the bottom plate 1 and the side plate 2 at the same time. A plurality of reinforcing beams 4 can reinforce the bottom plate 1 and the side plate 2 from the outside of the battery pack case, and improve the overall rigidity and strength of the battery pack case, thereby improving the overall impact resistance of the battery pack case so that the bottom plate 1 and the side plate 2 are not easy to be deformed by external force, ensuring the stability of the position of the unit cells contained inside and the stability of the connection between each other, and improving the safety of the use process. Alternatively, the reinforcing beams 4 may be welded to the bottom plate 1 and the side plate 2 or may be connected and fixed by fasteners.

As shown by combining FIG. 6 and FIG. 7, the battery pack case of the present embodiment further includes a strip plate 5. The strip plate 5 is provided at the connection between the long side of the bottom plate 1 and the side plate 2. One strip plate 5 is respectively arranged between the two opposite long sides of the bottom plate 1 and the side plate 2. The strip plate 5 extends along the length direction X of the bottom plate 1. The strip plate 5 includes a first long side 51 and a second long side 52 opposite to each other. The first long side 51 is connected and fixed to the side plate 2. The second long side 52 is connected and fixed to the long side of the bottom plate 1. The strip plate 5 can further improve the overall rigidity and strength of the battery pack case.

Alternatively, the cross-sectional shape of the strip plate 5 is L-shaped. The first long side 51 is welded to the side plate 2, and the second long side 52 is welded to the bottom plate 1.

A surface of the second long side 52 of the present embodiment facing away from the bottom plate 1 is lower than the surface of the bottom plate 1 facing the accommodating portion 3, so as to avoid the bottom of the unit cell from being seated on the surface of the second long side 52 facing away from the bottom plate 1 and a gap from occurring between it and the surface of the bottom plate 1 facing the accommodating portion 3, causing deterioration of the stability of the unit cell. The strip plate 5 further includes a plurality of first glue receiving grooves 53 disposed on the second long side 52. A plurality of first glue receiving grooves 53 are arranged at intervals along the length direction X of the bottom plate 1. When the unit cell is installed on the bottom plate 1, the structural glue squeezed by the unit cell adjacent to the side plate 2 in the width direction Y of the bottom plate 1 may flow into the first glue groove 53 to avoid the structure glue from flowing in any direction and causing wire harnesses or electrical components to stick. Alternatively, the shape of the first glue receiving groove 53 is V-shaped or U-shaped.

As shown by combining FIG. 5 and FIG. 7, the battery pack case of the present embodiment further includes a supporting beam 6. The supporting beam 6 is provided on the surface of the bottom plate 1 facing the accommodating portion 3. The bottom plate 1 includes two opposite wide sides. One supporting beam 6 is respectively provided on the two wide sides of the bottom plate 1. The supporting beam 6 extends in the width direction Y of the bottom plate 1. The supporting beam 6 includes a first connecting section 61, an intermediate supporting section 62, and a second connecting section 63 that are successively distributed along the length direction X of the bottom plate 1. The first connecting section 61 is connected and fixed to the side plate 2 or the wide side of the bottom plate 1. The second connecting section 63 is connected and fixed to the wide side of the bottom plate 1. The intermediate supporting section 62 is used to install and fix the unit cell.

In one embodiment, the intermediate supporting section 62 protrudes away from the bottom plate 1. The intermediate supporting section 62 includes a top surface parallel to the surface of the bottom plate 1 facing the accommodating portion 3, and a fixing hole 62a provided on the top surface and used to fix the unit cell. The top surface of the intermediate supporting section 62 is higher than the surface of the bottom plate 1 facing the accommodating portion 3. The unit cell is disposed between the two supporting beams 6, and its installation and fixation are realized by the connecting component connected to the two supporting beams 6 at the same time. Alternatively, the fixing hole 62a is a screw hole. The connecting component includes a screw rod connected to the screw of the fixing hole 62a.

In one embodiment, a surface of the second connecting section 63 facing away from the bottom plate 1 is lower than the surface of the bottom plate 1 facing the accommodating portion 3, so as to avoid interference of the second connecting section 63 in the installation and fixing process of the unit cell. The top surface of the intermediate supporting section 62 is higher than the surface of the second connecting section 63 facing away from the bottom plate 1. The supporting beam 6 further includes a plurality of second glue receiving grooves 64 provided on the second connecting section 63. The plurality of second glue receiving grooves 64 are arranged at intervals along the width direction Y of the bottom plate 1. When the unit cell is installed on the bottom plate 1, the structural glue squeezed by the unit cell adjacent to the side plate 2 in the length direction X of the bottom plate 1 may flow into the second glue receiving grooves 64, thereby avoiding the structure glue from flowing in any direction, which causes the wire harnesses or electrical components to stick. Alternatively, the shape of the second glue receiving groove 64 is V-shaped or U-shaped.

In the battery pack case of the embodiment of the present application, the first grooves 11 and the second grooves 12 are provided on the bottom plate 1. On the one hand, the strength and rigidity of the bottom plate 1 can be improved so as to avoid warp deformation of the bottom plate 1, ensuring that the bottom plate 1 maintains a good flatness, and further ensuring that the tops of the plurality of unit cells installed and fixed on the bottom plate 1 are flush, which is favorable to the welding operation of the bus bar on two adjacent unit cells. On the other hand, the first grooves 11 and the second grooves 12 can be used to collect excess structural glue that is squeezed out by the unit cell so as to avoid the structural glue from overflowing and contaminating the wiring harness or other electrical components, or causing the wiring harness or other electrical components to stick to each other, which facilitates subsequent maintenance or the replacement of the wiring harness or electrical components.

An embodiment of the present application further proposes a battery pack, including the battery pack case of the foregoing embodiment and a plurality of battery assemblies provided in the battery pack case. A plurality of battery assemblies are arranged side by side along the width direction Y of the bottom plate 1. Each of the battery assemblies includes a plurality of unit cells arranged side by side along the length direction X of the bottom plate 1. The unit cell is bonded to the bottom plate 1 of the battery pack case through structural glue. Since the flatness of the bottom plate 1 of the battery pack case is good, unevenness phenomenon may not occur on the top of each of the plurality of unit cells. The battery pack case includes good overall rigidity and strong impact resistance, thereby effectively protecting the unit cell.

Although the present application has been described with reference to the preferred embodiments, various improvements can be made and components therein can be replaced with equivalents without departing from the scope of the present application. In particular, as long as there is no structural conflict, the technical features mentioned in the various embodiments can be combined in any way. This application is not limited to the specific embodiments disclosed herein, but includes all technical solutions falling within the scope of the claims.

What is claimed is:

1. A battery pack case, comprising:
   a bottom plate and a side plate connected to the bottom plate, wherein the bottom plate and the side plate surround to form an accommodating portion configured to accommodate a unit cell;
   a plurality of first grooves and a plurality of second grooves opening toward the accommodating portion are provided on the bottom plate, wherein the plurality of first grooves are spaced apart from each other, the plurality of second grooves are spaced apart from each other, and the first grooves and the second grooves are arranged to cross each other,
   wherein a surface of the bottom plate facing away from the accommodating portion is further provided with a plurality of first convex portions corresponding to the first grooves and a plurality of second convex portions corresponding to the second grooves.

2. The battery pack case according to claim 1, wherein the first grooves extend in a length direction of the bottom plate, and the plurality of first grooves are arranged in parallel, and the second grooves extend in a width direction of the bottom plate, and the plurality of second grooves are arranged in parallel.

3. The battery pack case according to claim 2, wherein the first grooves and the second grooves are perpendicular to each other.

4. The battery pack case according to claim 1, wherein the battery pack case further comprises a strip plate, the strip plate is disposed at a connection between a long side of the bottom plate along a length direction of the bottom plate and the side plate, the strip plate comprises a first long side along the length direction of the bottom plate and a second long side along the length direction of the bottom plate opposite to each other, the first long side is connected and fixed to the side plate, and the second long side is connected and fixed to the long side of the bottom plate.

5. The battery pack case according to claim 4, wherein a surface of the second long side facing away from the bottom plate is lower than a surface of the bottom plate facing the accommodating portion, the strip plate further comprises a plurality of first glue receiving grooves provided on the second long side, and the plurality of first glue receiving grooves are arranged at intervals along the length direction of the bottom plate.

6. The battery pack case according to claim 1, wherein the battery pack case further comprises a supporting beam provided on a surface of the bottom plate facing the accommodating portion, the supporting beam comprises a first connecting section, an intermediate supporting section and a second connecting section successively distributed, the first connecting section is connected and fixed to the side plate or a wide side of the bottom plate along a width direction of the bottom plate, and the second connecting section is connected and fixed to the wide side of the bottom plate, the intermediate supporting section is configured to install the unit cell.

7. The battery pack case according to claim 6, wherein the intermediate supporting section protrudes away from the bottom plate, the intermediate supporting section comprises a top surface parallel to a surface of the bottom plate facing the accommodating portion and a fixing hole provided on the top surface and configured to fix the unit cell.

8. The battery pack case according to claim 6, wherein a surface of the second connecting section facing away from the bottom plate is lower than a surface of the bottom plate facing the accommodating portion, the supporting beam further comprises a plurality of second glue receiving grooves provided on the second connecting section, the plurality of second glue receiving grooves are arranged at intervals along the width direction of the bottom plate.

9. A battery pack, comprising:
a battery pack case comprising a bottom plate and a side plate connected to the bottom plate, wherein the bottom plate and the side plate surround to form an accommodating portion configured to accommodate a unit cell, a plurality of first grooves and a plurality of second grooves opening toward the accommodating portion are provided on the bottom plate, the plurality of first grooves are spaced apart from each other, the plurality of second grooves are spaced apart from each other, and the first grooves and the second grooves are arranged to cross each other; and
a plurality of battery assemblies provided in the accommodating portion and supported by the bottom plate, the plurality of battery assemblies are arranged side by side along a width direction of the bottom plate, and each of the battery assemblies comprises a plurality of unit cells arranged side by side in a length direction of the bottom plate,
wherein a surface of the bottom plate facing away from the accommodating portion is further provided with a plurality of first convex portions corresponding to the first grooves and a plurality of second convex portions corresponding to the second grooves.

* * * * *